Nov. 3, 1953 — F. W. SAMPSON — 2,657,589
MOLDED DECORATIVE STEERING WHEEL
Filed Oct. 5, 1950 — 2 Sheets-Sheet 1
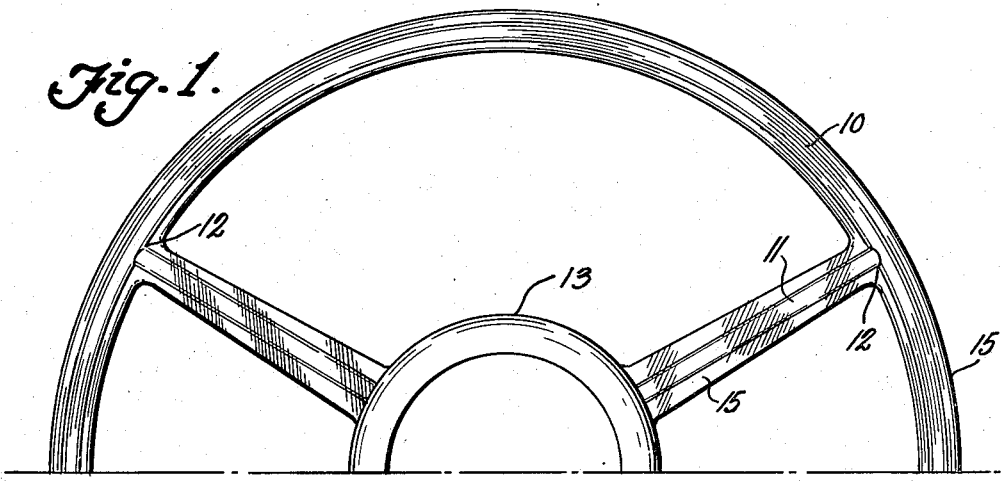
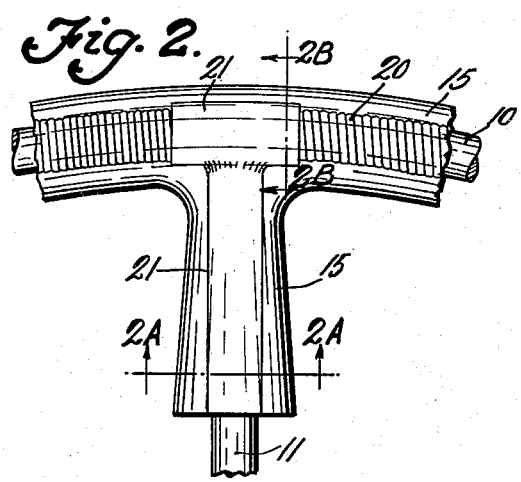
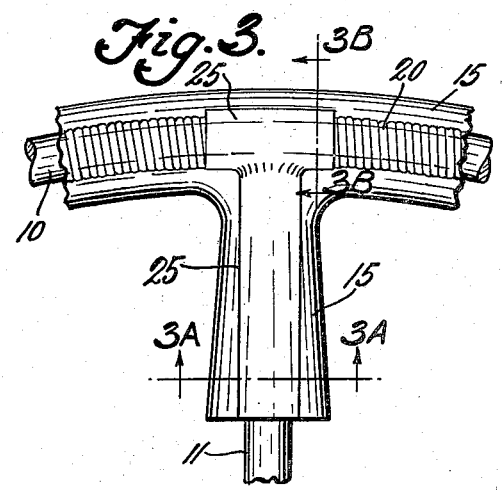
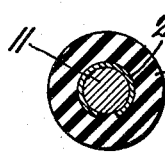
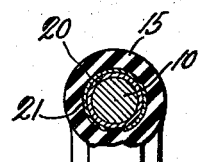
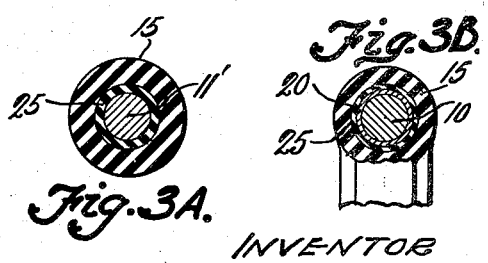
INVENTOR
F. W. SAMPSON
BY Willits Hardman & Fehr
his ATTORNEYS Nov. 3, 1953  F. W. SAMPSON  2,657,589
MOLDED DECORATIVE STEERING WHEEL
Filed Oct. 5, 1950  2 Sheets-Sheet 2
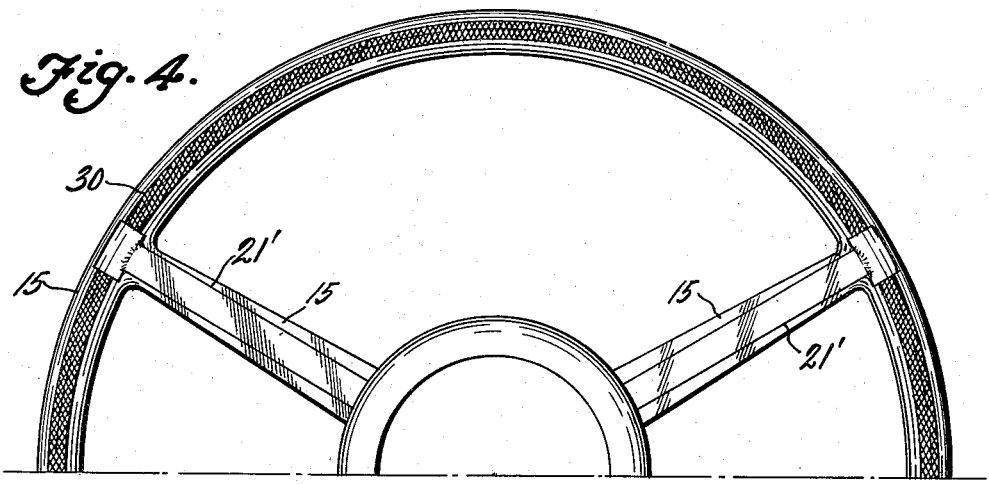
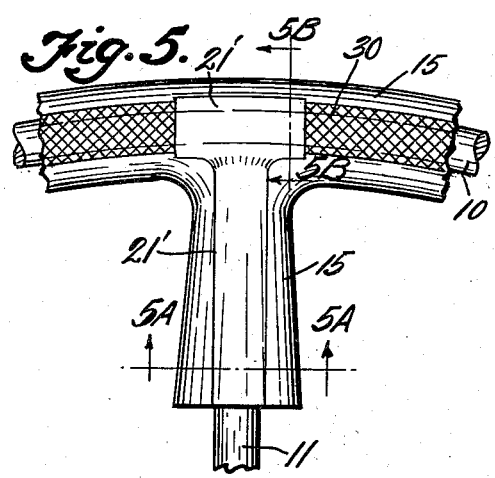
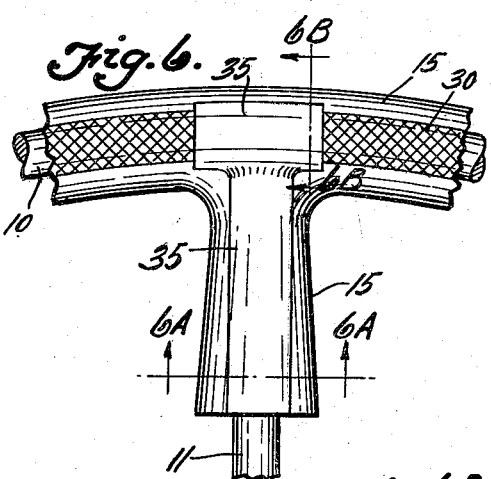
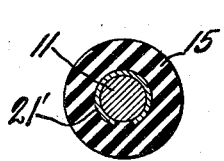
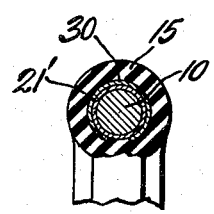
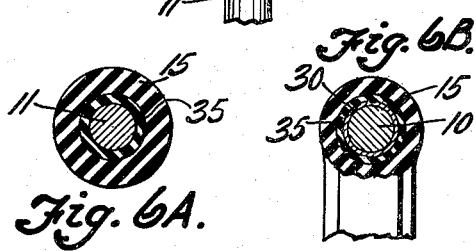
INVENTOR
F. W. SAMPSON
BY
Willits Hardman & Fehr
his ATTORNEYS Patented Nov. 3, 1953

2,657,589

UNITED STATES PATENT OFFICE 2,657,589

MOLDED DECORATIVE STEERING WHEEL

Frederick W. Sampson, Dayton, Ohio, assignor to General Motors Corporation, Detroit, Mich., a corporation of Delaware Application October 5, 1950, Serial No. 188,505

3 Claims. (Cl. 74—552)

This invention relates to hand wheels of the type used as automotive steering wheels.

An object of this invention is to provide an economically made molded steering wheel having the usual reinforcing steel inserts in the rim and spokes thereof, but having a novel embellished appearance due to a decorative covering concealing said steel inserts and a clear transparent body of molded plastic material encasing said decorative covering and bonded directly thereto. Various means for applying a decorative covering over the steel inserts may be used, such as by wrapping the rim and spoke inserts with an encasing sheath of decorative wire or woven metal, or by covering the steel spoke inserts with decorative opaque plastic or sheet metal sheaths. Also the ordinary steel inserts may be covered with a very thin bright metal coating such as by depositing vaporized aluminum thereupon after said inserts are first painted to smooth out minor roughness of the surfaces thereof.

Further objects and advantages of the present invention will be apparent from the following description, reference being had to the accompanying drawings wherein a preferred embodiment of the present invention is clearly shown.

In the drawings:

Fig. 1 is a plan view of half of a steering wheel made according to this invention, wherein the usual metal spider insert is coated with a very thin vaporized metal coating which shows up prominently thru a protective lacquer coating and thru the clear transparent molded body upon the rim and spokes.

Fig. 2 is a partial view of another form of the invention wherein the rim insert is wrapped with a decorative wire and the spoke inserts are encased in decorative sheet metal sheaths.

Figs. 2A and 2B are sections taken along lines 2A and 2B respectively on Fig. 2.

Fig. 3 is a partial view of a third form of the invention wherein the rim insert is wrapped with a decorative wire and the spoke inserts are encased in a decorative sheath of plastic material of any desired color.

Figs. 3A and 3B are sections taken along lines 3A and 3B respectively on Fig. 3.

Fig. 4 is a partial view of a fourth form of the invention wherein the rim insert is encased in a decorative sheath of woven metal wire and the spoke inserts are encased in decorative sheet metal sheaths.

Fig. 5 is a partial view of the same wheel shown in Fig. 4 except that the molded portions on the spoke inserts do not extend all the way to the wheel hub.

Figs. 5A and 5B are sections taken along lines 5A and 5B respectively on Fig. 5.

Fig. 6 is a partial view of still another form of the invention, similar to that of Fig. 5 except in Fig. 6 the spoke inserts are encased in decorative sheaths of plastic material of any desired color.

Figs. 6A and 6B are sections taken along lines 6A and 6B respectively on Fig. 6.

In the forms shown in Figs. 2, 3, 4, 5 and 6 the decorative sheaths on the spoke inserts overlap and retain in place the ends of the rim sheaths at the joints between the spoke and rim inserts.

Similar reference characters refer to similar parts throughout the several views.

Throughout the drawings 10 designates the metal rim ring insert, 11 the metal spoke inserts welded thereto at their outer ends 12, and 15 designates the transparent molded body. The inner ends of spoke inserts 11 are rigidly fixed to a suitable wheel hub 13 by welding or screw threads. These rim and spoke inserts 10 and 11 provide the necessary strength to the final molded wheel and may be made of ordinary rough surfaced steel rods commonly used for that purpose. According to this invention these ordinary steel inserts 10 and 11 are covered by a decorative coating or closely fitting sheath and then the skeleton spider is set within a mold as an insert therein and a one-piece clear transparent body 15 of a suitable plastic material is molded upon the rim and spoke portions of the wheel so that the decorative insert stands out prominently and appears magnified in size due to the lens effect of the rounded molded transparent body.

In the form shown in Fig. 1 the ordinary steel inserts 10 and 11 are covered with a very thin bright metal coating appearing as gold, silver, or other desired colors, by depositing vaporized metal thereupon and then covering the vaporized metal coating with a clear lacquer coat if a polished metal appearance is desired, or with a tinted but transparent lacquer coat which is tinted according to the color desired. Preferably the steel inserts 10 and 11 are first painted with a suitable opaque paint or enamel which will flow and smooth out minor roughnesses on said inserts and provide a smooth apparently polished coat thereon. This undercoat may be black enamel or any other color since it is concealed by later coats. Then a very thin flash coating of vaporized metal, preferably aluminum, is deposited over this smooth polished undercoat by a well-known method of applying thin vaporized metal coats to such surfaces. This flash coating appears smooth and polished due to the smooth undercoat but is very thin and soft and easily marred. Hence it is given a protective coating of transparent lacquer to prevent the vulnerable vaporized metal coat from being scratched or otherwise marred by the subsequent operation of molding the transparent plastic body thereupon. A polished bright gold appearance may be obtained simply by covering the vaporized metal coat with a transparent yellow-tinted lacquer which is preferably applied as a spray coat. Also this protective coating may be tinted with various other colors to provide various other color effects to the aluminum or other metal coating immediately thereunder. In all cases the vaporized metal coating remains prominently visible thru the clear or tinted protective lacquer coating and thru the clear transparent plastic body 15 molded thereupon.

The metal spider comprising the rim and spoke portions, coated as above described is then set as an insert within a suitable mold and a one-piece body 15 of clear transparent plastic material molded thereupon to fully embed the decorated rim and spoke portions. One suitable clear plastic material for molding the body 15 used by me is cellulose acetate butyrate thermoplastic, readily obtainable under the trade name of "tenite 2." Other suitable clear plastics are well known in the art, such as polystyrene, acrylic polymer resins (Plexiglas) and methyl methacrylate (Lucite).

In the form shown in Figs. 2, 2A and 2B, the steel rim ring insert 10 is decorated with a snugly fitting wire wrapping 20 of a decorative wire such as stainless steel or aluminum wire. The steel spoke inserts 11 are encased in closely fitting decorative sheaths 21 of sheet metal which overlap and conceal the joints between the spoke inserts 11 and the wire wrapped rim insert 10. The one-piece clear transparent body 15 is then molded directly upon the wire wrapping 20 and the decorative metal stampings 21 to form the main body of the steering wheel.

The form shown in Figs. 3, 3A, and 3B is the same in all respects as that shown in Fig. 2 except that opaque decorative plastic covers 25 of any desired color are substituted for the decorative sheet metal stampings 21. The decorative plastic covers 25 are preferably molded upon the inserts in a preliminary molding operation, and overlap and conceal the joints between spoke inserts 11 and rim insert 10.

In the form shown in Figs. 5, 5A and 5B the steel rim insert 10 is encased within a braided or woven wire sheath 30 of aluminum, stainless steel, or other metal. The steel spoke inserts 11 are encased within closely fitting decorative sheet metal stampings 21' which overlap and conceal the joints between spoke inserts 11 and rim insert 10 and also securely clamp the underlying portions of woven wire sheath 30 in place. These stampings 21' are substantially the same as the stampings 21 of Fig. 2. The one-piece transparent body 15 is then molded directly upon the sheath 30 and the decorative stampings 21' to form the main body of the wheel.

The form shown in Figs. 6, 6A and 6B is substantially the same as that shown in Fig. 5 except that opaque decorative plastic covers 35 of any desired color are substituted for the sheet metal decorative covers 21' of Fig. 5. These plastic covers 35 are preferably molded upon the inserts in a preliminary molding operation and overlap and conceal the underlying portions of the woven wire sheath 30. The one-piece transparent body 15 is then molded directly upon the sheath 30 and the decorative plastic covers 35.

In Figs. 2, 3, 5, and 6 the molded spoke portions are shown as stub spokes which extend only to that portion of the wheel which will be covered by the horn ring assembly or other central structure to be used with the wheel. However in all forms of the invention the molded spoke portions may obviously extend all the way to the wheel hub (as shown in Figs. 1 and 4) if so desired.

While the embodiment of the present invention as herein disclosed, constitutes a preferred form, it is to be understood that other forms might be adopted.

What is claimed is as follows:

1. A steering wheel comprising in combination; a reinforcing metal spider including a metal ring and a plurality of spoke members, a decorative covering of flexible wire wrapped around at least a portion of the ring for concealing that portion of the ring, and a transparent body molded directly to said covering, said body having such a rounded cross section so as to magnify the apparent turns of the wire when viewed through said transparent body.

2. A steering wheel comprising in combination; a reinforcing metal spider including a metal ring and a plurality of spoke members, a decorative covering of flexible wire wrapped around at least a portion of the ring, a decorative sheath concealing at least a portion of one of said spoke members, and a transparent body of plastic material molded directly upon said wire and sheath, said body having a rounded cross section so as to magnify the apparent size when viewed through said transparent body.

3. A steering wheel comprising in combination; a reinforcing metal spider including a metal ring and a plurality of spoke members joined thereto, a decorative covering of flexible wire encasing said ring except at those portions where the spoke member joins the ring, and a plurality of individual decorative metal stampings one of which encases each of the individual spoke members, the outer ends of said stampings extending around and covering the joints between said ring and spoke members, and a one piece transparent body of plastic material molded directly upon and embedding said wire on the ring and decorative sheaths on the spoke members, said body having a rounded cross section so as to magnify the apparent size of the wire and sheath when viewed through said transparent body.

FREDERICK W. SAMPSON.

References Cited in the file of this patent

UNITED STATES PATENTS

| Number | Name | Date |
| --- | --- | --- |
| Re. 19,103 | Assael | Mar. 6, 1934 |
| 1,301,069 | MacDonald | Apr. 15, 1919 |
| 1,394,361 | Scharpp | Oct. 18, 1921 |
| 1,778,726 | Pappert | Oct. 21, 1930 |
| 1,826,669 | Neidick | Oct. 6, 1931 |
| 1,905,926 | Marback et al. | Apr. 25, 1933 |
| 2,041,739 | Beck | May 26, 1936 |
| 2,266,129 | Tegarty | Dec. 16, 1941 |
| 2,311,448 | Lange | Feb. 16, 1943 |